US008605573B2

(12) United States Patent
Elam et al.

(10) Patent No.: US 8,605,573 B2
(45) Date of Patent: Dec. 10, 2013

(54) AUTOLEARNING NETWORK LINK PROTECTION DEVICE

(75) Inventors: Gordon B. Elam, Oceanport, NJ (US); Jiri Hlavaty, Wayne, NJ (US)

(73) Assignee: Shore Microsystems Inc., Long Branch, NJ (US)

( * ) Notice: Subject to any disclaimer, the term of this patent is extended or adjusted under 35 U.S.C. 154(b) by 1539 days.

(21) Appl. No.: 12/146,731

(22) Filed: Jun. 26, 2008

(65) Prior Publication Data

US 2009/0323517 A1 Dec. 31, 2009

(51) Int. Cl.
*G01R 31/08* (2006.01)
*H04L 12/28* (2006.01)

(52) U.S. Cl.
USPC .................. 370/219; 370/244; 370/392

(58) Field of Classification Search
None
See application file for complete search history.

(56) References Cited

U.S. PATENT DOCUMENTS

| | | | |
|---|---|---|---|
| 5,448,723 A | 9/1995 | Rowett | |
| 5,732,071 A * | 3/1998 | Saito et al. | 370/255 |
| 5,859,959 A | 1/1999 | Kimball et al. | |
| 6,032,194 A | 2/2000 | Gai et al. | |
| 6,262,977 B1 | 7/2001 | Seaman et al. | |
| 6,331,983 B1 | 12/2001 | Haggerty et al. | |
| 6,388,995 B1 | 5/2002 | Gai et al. | |
| 6,473,403 B1 | 10/2002 | Bare | |
| 6,535,491 B2 | 3/2003 | Gai et al. | |
| 6,680,917 B1 | 1/2004 | Seaman | |
| 6,717,922 B2 | 4/2004 | Hsu et al. | |
| 6,766,482 B1 | 7/2004 | Yip et al. | |
| 6,891,840 B2 | 5/2005 | Okada | |
| 6,917,986 B2 | 7/2005 | Mor et al. | |
| 6,940,825 B2 | 9/2005 | Goldman et al. | |
| 6,941,487 B1 | 9/2005 | Balakrishnan et al. | |
| 6,947,384 B2 | 9/2005 | Bare | |
| 6,963,575 B1 | 11/2005 | Sistanizadeh et al. | |
| 6,976,088 B1 | 12/2005 | Gai et al. | |
| 7,003,705 B1 | 2/2006 | Yip et al. | |
| 7,027,406 B1 | 4/2006 | Shabtay et al. | |
| 7,085,224 B1 | 8/2006 | Oran | |
| 7,154,861 B1 | 12/2006 | Merchant et al. | |
| 7,173,934 B2 | 2/2007 | Lapuh et al. | |
| 7,177,946 B1 | 2/2007 | Kaluve et al. | |
| 7,209,435 B1 | 4/2007 | Kuo et al. | |
| 7,233,991 B2 | 6/2007 | Adhikari | |
| 7,260,066 B2 | 8/2007 | Wang et al. | |
| 7,283,476 B2 | 10/2007 | Bare | |
| 2008/0002570 A1 * | 1/2008 | Kurokawa et al. | 370/219 |
| 2008/0219273 A1 * | 9/2008 | Kaneko | 370/401 |
| 2008/0285437 A1 * | 11/2008 | Polland | 370/219 |
| 2009/0285090 A1 * | 11/2009 | Allasia et al. | 370/221 |
| 2010/0014527 A1 * | 1/2010 | Sakauchi et al. | 370/400 |
| 2011/0058472 A1 * | 3/2011 | Owens et al. | 370/228 |

* cited by examiner

*Primary Examiner* — Yemane Mesfin
*Assistant Examiner* — Christine Duong
(74) *Attorney, Agent, or Firm* — Alchemy-Partners, PC; Ajay A. Jagtiani

(57) ABSTRACT

An apparatus and method for updating a network as to the link used by a protected network device when a first switch for the protected network device fails or is determined to be once again operational. The link protection device builds and transmits an update data packet on a second link for the protected network device that emulates a data packet sent from the protected network device on the second link.

17 Claims, 4 Drawing Sheets

AUTOLEARNING NETWORK LINK PROTECTION DEVICE

BACKGROUND

1. Field of the Invention

The present invention relates to a link protection device for a computer network.

2. Related Art

A computer network typically comprises a plurality of interconnected network devices. A network device, such as a computer or end station, "sources" (i.e., transmits) and/or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate devices are often used to couple LANs together and allow the corresponding entities to exchange information. For example, a switch may be utilized to provide a "switching" function for transferring information, such as data frames, among entities of a computer network. Typically, the switch is a computer-like system including a plurality of ports that couple the switch to the other entities. Ports used to couple switches to each other are generally referred to as a trunk ports, whereas ports used to couple a switch to LANs or end stations are generally referred to as local ports. The switching function includes receiving data at a source port from an entity and transferring that data to at least one destination port for receipt by another entity.

Switches typically learn which destination port to use in order to reach a particular entity by noting on which source port the last message originating from that entity was received. This information is then stored by each switch in a block of memory referred to as a filtering database. Thereafter, when a message addressed to a given entity is received on a source port, the switch looks up the entity in its filtering database and identifies the appropriate destination port to utilize in order to reach that entity. If no destination port is identified in the filtering database, the switch floods the message out all ports, except the port on which the message was received. Messages addressed to broadcast or multicast addresses are also flooded.

To prevent the information in the filtering database from becoming stale, each entry is "aged out" by a corresponding timer. Specifically, when an entry is first added to the filtering database, the respective timer is activated. Thereafter, each time the switch receives a subsequent message from this entity on the same source port, it simply resets the timer. Pursuant to standards set forth by the Institute of Electrical and Electronics Engineers (IEEE), the default value of the timer is five minutes as set out in IEEE Standard 802.1D. Thus, provided the switch receives a message from a particular entity at least every five minutes, the timer will keep being reset and the corresponding entry will not be discarded. If the switch stops receiving messages, the timer will expire and the corresponding entry will be discarded. Once the entry ages out, any messages subsequently received for this entity must be flooded, until the switch receives another message from the entity and thereby learns the correct destination port.

SUMMARY

According to a first broad aspect of the present invention, there is provided an apparatus comprising: a link protection device for a network including one or more protected network devices, each of the protected network devices having a first link that provides a connection between the link protection device and the network for each respective protected network device, and each of the protected network devices having a first network switch that is part of the first link, wherein the link protection device comprises: a determination system for determining if a first network switch for one or more of the protected network devices has failed; a link switch for each of the protected network devices for switching the connection for each protected network device from a first link to a second link for each respective protected network device upon the determination system determining that the first network switch for the respective protected network device has failed; a protected port for connecting each respective protected network device to the respective first and second links for the protected network device; a storage device for storing a network address for each of the protected network devices; and a transmission system for building and transmitting a first update data packet to network switches of the network over the second link for a protected network device when the link protection device switches the connection for the protected network device from the first link to the second link for the protected network device, and wherein the first update data packet has a source comprising the stored network address of the protected network device and has a destination comprising the broadcast address of the network to thereby emulate a transmission from the protected network device.

According to a second broad aspect of the present invention, there is provided a method comprising the following steps: (a) switching the connection to a network for a protected network device from a first link for the protected network device to a second link for the protected network device when a first network switch that is part of the first link has been determined to have failed; (b) building an update data packet having a source comprising a network address of the protected network device and having a destination comprising the broadcast address of the network; and (c) transmitting the update data packet to network switches of the network to thereby inform the network switches that the protected network device is using the second link instead of the first link.

According to a third broad aspect of the present invention, there is provided a method comprising the following steps: (a) determining if a first network switch that is part of a first link for a protected network device that has previously failed is operational; (b) switching the connection to a network for the protected network device from a second link for the protected network device to the first link for the protected network device upon the first network switch being determined to be operational in step (a); (c) building an update data packet having a source comprising a network address of the protected network device and having a destination comprising the broadcast address of the network; and (d) transmitting the update data packet to network switches of the network to thereby inform the network switches that the protected network device is using the first link instead of the second link.

BRIEF DESCRIPTION OF THE DRAWINGS

The invention will be described in conjunction with the accompanying drawings, in which.

DETAILED DESCRIPTION

Figure 1:
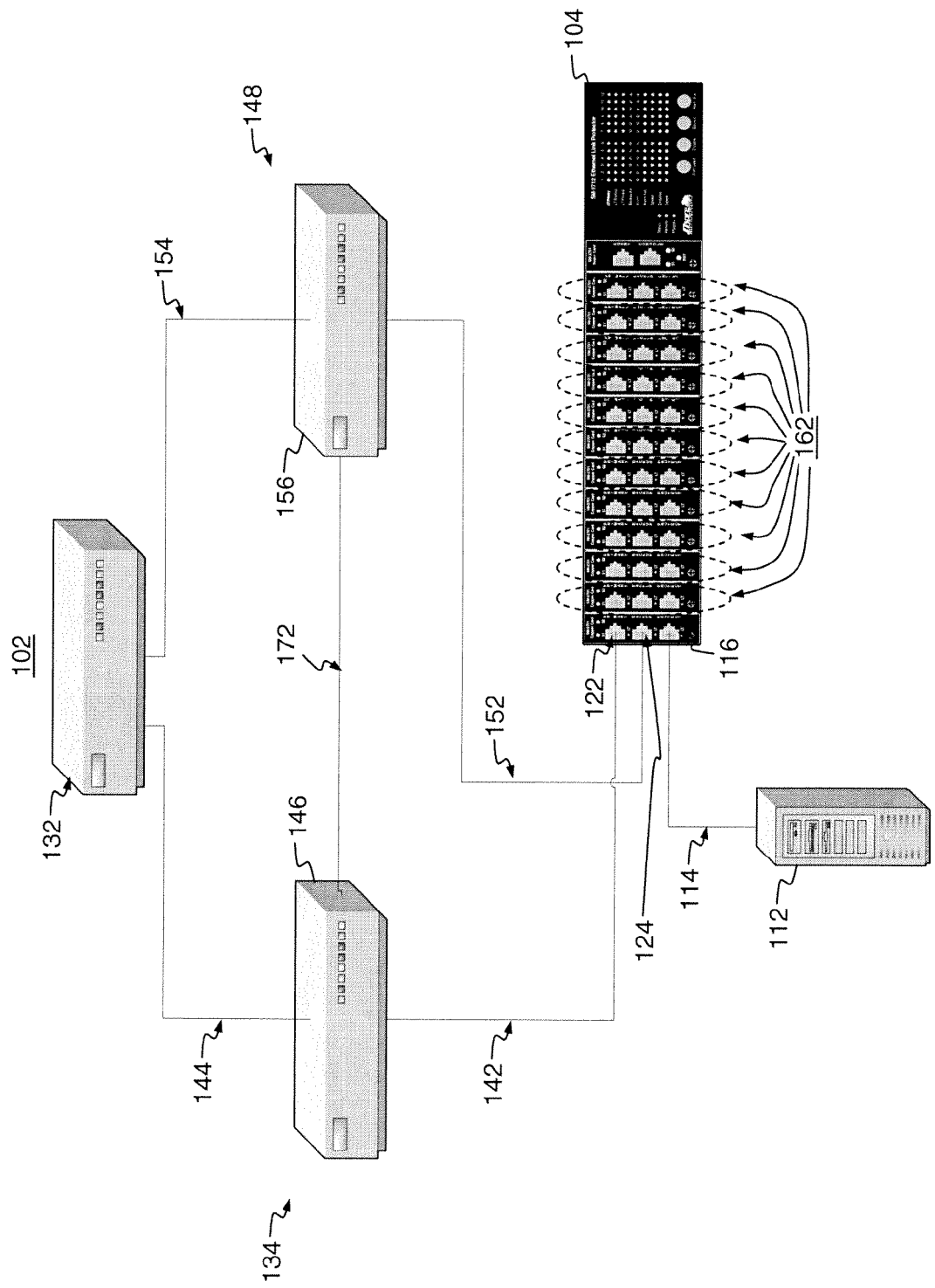
FIG. 1 is a schematic diagram of part of a network employing a link protection device according to one embodiment of the present invention.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the sake of simplicity in describing the present invention, a network device may be described as "having" a link, switches, connection, etc. to refer to links, switches, connections, etc. that are used or that may be used by the network device, whether or not link, switch or connection is actually part of the network device or physically connected to the network device.

For the purposes of the present invention, the term "network address" refers to any type of address used to serve as an identifier for a particular network adapter/network device. In the computer networking industry, a network address may be referred to as a Media Access Control address (MAC address), Ethernet Hardware Address (EHA), etc.

For the purposes of the present invention, the term "backup link" of a network device refers to a connection that is connected to the link protection device backup port for that network device. A backup link is the link used when the primary link has been determined to have a failed primary network switch.

For the purposes of the present invention, the term "backup network switch" refers to a network switch on the backup link for a network device.

For the purposes of the present invention, the term "broadcast address of a network" refers to the particular network address that references all network addressable devices. In the case of Ethernet, the broadcast address is the "all-ones" address consisting of 48 consecutive "1" bits.

For the purposes of the present invention, the term "link protection device" refers to any device, such as a link protection device or chassis, that switches between two links for a network device: (1) when the link protection device determines that a switch on one of the links has failed or (2) when the link protection device determines that that a switch on a link that has previously failed is once again operational.

For the purposes of the present invention, the term "network device" refers to any type of device that "sources" (i.e., transmits) and/or "sinks" (i.e., receives) data frames in a computer network. Examples of network devices include: computers, servers, printers, monitors, terminals, printers, scanners, fax machines, cell phones, personal data assistants (PDA), etc. Because each network device has an associated network interface card (NIC) or NIC card-like function that allows the network device to be connected to a network, the terms "network device" and "NIC" are used interchangeably below in describing the apparatus and method of the present invention, unless specified otherwise.

For the purposes of the present invention, the term "protected device" refers to a network device connected to a protected port of a link protection device of the present invention.

For the purposes of the present invention, the term "primary network switch" refers to a network switch on the primary link for a network device.

For the purposes of the present invention, the term "primary link" of a network device refers to a connection that is connected to the link protection device primary port for that network device.

Description

The spanning tree protocol for Ethernet requires that switches (bridges) learn network topology by determining the MAC addresses of those devices connected to each switch. This spanning tree protocol prevents network loops by proceeding through a sequence of steps before data from a network endpoint, such as a network interface card (NIC) of a network device, is allowed to be forwarded on the network.

Modern network switches contain a fast learning feature that eliminates the spanning tree steps and immediately moves an interface to the forwarding mode. This fast learning feature is known by various trade names such as: PortFast™ by Cisco Systems Inc., FastStart™ by 3Com®, Fast Mode™ by Hewlett-Packard) and is widely used. However, a problem exists in using Portfast™ in conjunction with a link protection device such as the SM-27XX™ series from Shore Microsystems. The problem occurs since it is possible for the link protection device to determine that a link to a primary network switch has failed, moving the connection to a backup link, and switching the connection to a backup link without making this fact known to any other network switch in the network.

This results in a situation where, unless the protected device sends a data packet containing its MAC address (to be learned by the backup switch), the backup switch port is not aware of the address of the newly connected NIC/network device. In this case, other network switches still believe the network device is still using the failed primary network switch and continue to send traffic to a "dead" port or "black hole". The way this issue is resolved, without the current invention, is that the switches use ageing timers that record the elapsed time since a switch received a data packet from (not to) each MAC address/switchport. If one of these timers expires, then any subsequent data packets received by the switch destined for that particular MAC address result in "flooding" of the received packet to all ports on the switch e.g. the packet is broadcast to all active ports. These packets propagate through the network and ultimately results in the packet being flooded to the backup port that, in turn, is sent through the link protection device to the original protected device. If the protected device either responds to this packet with a returned packet or, for whatever reason, sends an unsolicited packet, the backup switchport will learn this address and begin forwarding packets into the network. These activity timers are normally 5 minutes by default for IEEE 802.3 and thus, until the protected device sends a packet after being switched to the backup port (either unsolicited or in response to a received packet), the protected device will be disconnected from end-to-end communications until the ageing timer expires.

In one embodiment, the present invention resolves the re-learning issue by a two step "auto-learning" procedure. In the first step, a link protection device is programmed to learn and/or remember the network address of a protected network device or to have the network address directly entered by configuration commands. Either way, the second step of the procedure involves the link protection device transmitting a specially built update data packet containing as its source the network address obtained in the first step and as its destination the network broadcast address. The remaining contents of the update data packet are designed to have no impact on the overall network other than resolving the network address issues and will be ignored by any network endpoints, such as other network devices. This update data packet is constructed within the link protection device and emulates a broadcast packet that could have been transmitted by the protected network device i.e. the update data packet includes information indicating the source of the update data packet is the protected network device. The update data packet may be custom built for each case and may include, correctly calculated CRC checksums. The update data packet transmitted just before the link protection device switches the connection for the protected network device from the primary link to the backup link for the network device. The update data packet causes the learning process to occur in the backup port of the link protection device. The destination of the update data packet is the broadcast network address to ensure that the update data packet is forwarded to all other switches in the overall network. Thus, all switches in the network will receive a packet from the "emulated" network device on a link that is currently operational i.e. the backup link.

An important feature of a link protection device of the present invention is that the link protection device is able to transmit as well as receive data packets on the links connected to the link protection device.

U.S. Pat. No. 6,388,995 to Gai et al., assigned to Cisco Technology, Inc., describes a system known as by their trade name UplinkFast™ which is used for switches to reroute traffic around failed switch-to-switch links. This method operates by sending multicast Ethernet packets to cause relearning in adjacent switches rather than sending broadcast packets. The Gai system is also only designed to be used with switch-to-switch connections. The system described in Gai is predicated on the assumption that the network device is operatively participating in the spanning tree protocol which is not the case where a network device is connected to a link protection device of the present invention. Furthermore, the problem addressed by Gai relates to interswitch links, as opposed to the present invention which addresses issues related to network device access links connected to a link protection device.

FIG. 1 shows part of a network 102 employing an auto-learning link protection device 104 according to one embodiment of the present invention. A network device, computer 112, is connected by a connection 114 to a protected port 116 of link protection device 104. Protected port 116 is mapped to a primary port 122 and a backup port 124 by internal logic (not shown) in link protection device 104. Primary port 122, and therefore computer 112, is connected to a network switch 132 by a primary link 134 that includes connections 142 and 144 and primary switch 146. Connection 142 connects primary port 122 to primary switch 146 and connection 144 connects primary switch 146 to network switch 132. Backup port 134, and therefore computer 112, is also connected to network switch 132 by a backup link 148 that includes connections 152 and 154 and backup switch 156. Connection 152 connects backup port 122 to backup switch 156 and connection 154 connects backup switch 156 to network switch 132. Link protection device 104 includes eleven (11) additional sets 162 of protected ports, primary ports and backup ports so that up to (11) additional network devices (not shown) may be connected to link protection device 104. Connection 172 connects primary switch 146 and backup switch 156 to thereby provide alternate data paths in the event of a failure in connection 144 or 154.

For simplicity of illustration only one network switch, one link protection device, one network device and one set of primary and backup switches for the network device are shown in FIG. 1, but it should be understood that the present invention may be used with a network having multiple network switches, multiple link protection devices and multiple network devices with each network device having an associated primary switch and backup switch.

The network switches, primary switches and backup switches of the present invention may be any type of switch used in a network. Examples of suitable switches that may be used with the invention includes Catalyst 3560 made by Cisco and Superstack made by 3Com.

The protected, primary and backup ports of a link protection device of the present invention may be copper ports, fiber ports, or a combination of these technologies, such as found on an SM-2712 made by Shore Microsystems, Inc.

The link protection device and method of the present invention may be used with various types of network technology independent of media, speed, etc. With respect to Ethernet networks, the present invention may be used with various forms of Ethernet including: twisted pair copper, fiber, speed independent, duplex independent, etc.

Figure 2:
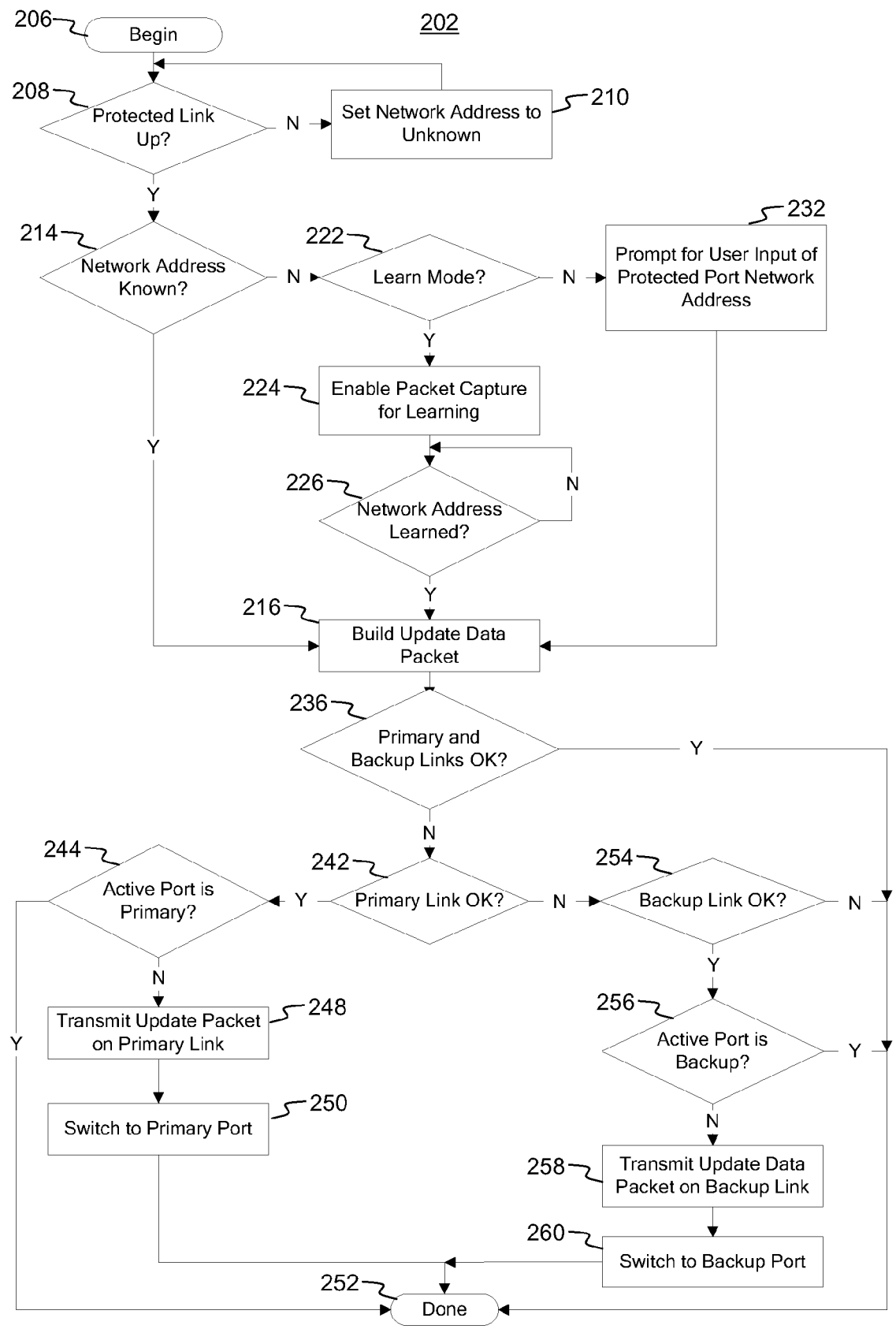
FIG. 2 is flowchart diagram illustrating how a link protection device implements a method according to one embodiment of the present invention.

FIG. 2 described in detail below, shows how a typical set of commands may be defined on a port-by-port basis to implement the auto-learning method according to one embodiment of the present invention.

Figure 3:
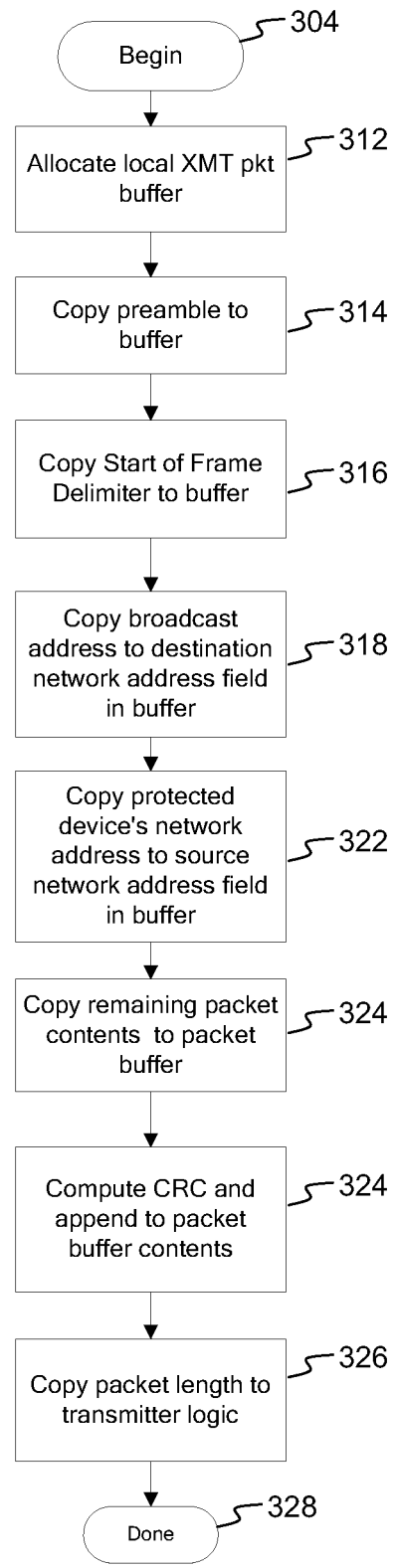
FIG. 3 is a flowchart diagram illustrating a packet assembly logic of a link protection device building an update data packet according to one embodiment of the present invention.

FIG. 2 shows a process 202 according to one embodiment of the present invention. Process 202 begins at step 206 with a user connecting a network device to a link protection device of the present invention at a protected port. At step 208, if the protected port link is not operational, the network address for the protected port is set at step 210 to "unknown" to ensure that the learning mode, if used, will adapt to the connection of a new or different protected network device. At step 214, if the network address of the protected port NIC is known by the link protection device, an update data packet is built at step 216. An example of how an update data packet according to the present invention may be built is shown in FIG. 3 and described in more detail below.

If the network address for the network device is not known by the link protection device, then the link protection device must determine whether to activate a learning mode at step 222. If the learn mode is activated at step 222, the link protection device enables packet capture for learning the network address of protected port at step 224. At step 226, the link protection device attempts to learn the network address that is part of the packet. If the network address is not learned, step 226 is repeated. If the network address is learned, an update data packet is built at step 216.

If the learn mode is not activated at step 222, at step 232 the link protection device prompts the user to input the network address of the network device connected to the protected port. Once the user enters the appropriate network address, an update data packet is built at step 216.

At step 236 the link protection device determines if the primary and backup links are operating properly. If both links are operating properly, the process terminates at step 252 and immediately restarts at step 206.

If the link protect device determines at step 236 that one of the links is not operating properly, the link protection device determines at step 242 whether the primary link is operating properly. If the primary link is operating properly, the link protection device determines at step 244 if the currently active port is the primary port. If the active port is not the primary port, the process terminates at step 252 and immediately restarts at step 206. If the link protection device determines that the primary port is not currently active, at step 248 the previously built update data packet is transmitted on the primary link to the network switches of the network to communicate to the network switches that the network device is using the primary link. Then, the link protection device switches the active port to the primary port at step 250 and the process terminates at step 252 and immediately restarts at step 206.

If at step 242 the link protective device determines that the primary link not operating properly, the link protection device determines if the backup link is working properly at step 254. If the backup link is not working properly, the process terminates at step 252 and immediately restarts at step 206. If the link protective device determines at step 254 that the backup link is operating properly, the link protection device determines whether the active port is the backup port at step 256. If the active port is not the backup port, the process terminates at step 252 and immediately restarts at step 206.

If the link protection device determines that the backup port is not currently active, at step 258 the previously built update data packet is transmitted on the backup link to network switches of the network to communicate to the network switches that the network device is using the backup link. Then link protection device switches the active port to the backup port at step 260, and the process terminates at step 252 and immediately restarts at step 206. An example of how an update data packet may be transmitted is shown in FIG. 4 and described in more detail below.

FIG. 3 illustrates a process 302 in which packet assembly logic of a link protection device builds an update data packet according to one embodiment of the invention. After process 302 begins at step 304, the packet assembly logic allocates local transmit packet buffer for update data packet at step 312. Then the preamble is copied to the packet buffer at step 314. Then the broadcast address is copied into the network address field in the packet buffer at step 316. Then the protected device's network address is copied to the source network field in the buffer at step 318. Then the remaining packet contents are copied to the packet buffer at step 322. The CRC for the update data packet is computed and appended to the packet buffer contents at step 324. Finally, the packet length is copied to transmitter logic of the link protection device at step 326 and the process finishes at step 328.

Figure 4:
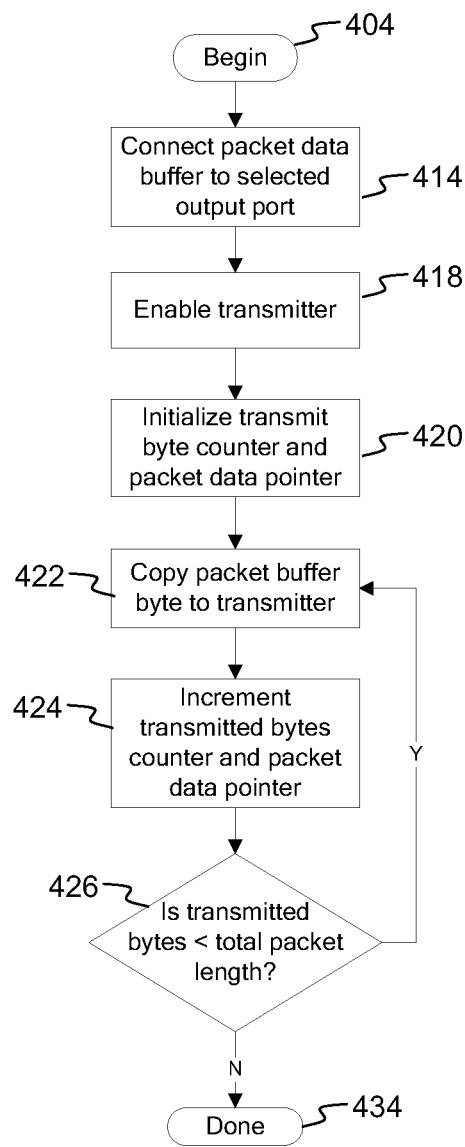
FIG. 4 is a flowchart diagram illustrating a transmit logic of a link protection device transmitting an update data packet according to one embodiment of the present invention.

FIG. 4 illustrates a process 402 in which the transmitter logic of a link protection device transmits an update data packet on a link according to one embodiment of the invention. After process 402 begins at step 404, at step 414 the packet data buffer for the update data packet is connected to the selected (output) port for the network device. The transmitter is enabled by the transmitter logic at step 418 to transmit the update data packet to the network devices of the network. Once the transmitter is enabled, the transmit byte counter and packet data pointer are initialized at step 420. Then the packet buffer byte for the update data packet is copied to the transmitter at step 422. Then the transmitted bytes counter and packet data pointer are incremented at step 424. If at step 426 the transmitter logic determines that the number of transmitted bytes is less than the total packet length, step 422, 424 and 426 are repeated as necessary.

If at step 426 the transmitter logic determines that the number of bytes that have been transmitted is not less than the total packet length, the process terminates at step 434.

The process shown in FIG. 2 illustrates an embodiment of the present invention in which the primary port is the preferred port and the backup is the alternate port that will be utilized if the primary port fails. In another embodiment of the present invention the process of FIG. 2 may be modified so that there is no inherent priority of the ports. In this alternate embodiment, port switchover (and preceding packet send operation) would only occur on failure of the link that is currently connected.

Either or both of the processes illustrated in FIGS. 3 and 4 may be implemented in hardware logic files (FPGA code) as well as in controller firmware for the link protection device.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An apparatus comprising:
 a link protection device for a network including one or more protected network devices, each of the protected network devices having a first link that provides a connection between the link protection device and the network for each respective protected network device, and each of the protected network devices having a first network switch that is part of the first link, wherein the link protection device comprises:
  a determination system for determining if the first network switch for one or more of the protected network devices has failed;
  a link switch for each of the protected network devices for switching the connection for each protected network device from the first link to a second link for each respective protected network device upon the determination system determining that the first network switch for the respective protected network device has failed;
  a protected port for connecting each respective protected network device to the respective first and second links for the protected network device;
  a storage device for storing a network address for each of the protected network devices; and
  a transmission system for building and transmitting a first update data packet to network switches of the network over the second link for a protected network device when the link protection device switches the connection for the protected network device from the first link to the second link for the protected network device, and wherein the first update data packet has a source comprising the stored network address of the protected network device and has a destination comprising the broadcast address of the network to thereby emulate a transmission from the protected network device.

2. The apparatus of claim 1, wherein the first link is a primary link, the first network switch is a primary network switch and the second link is a backup link.

3. The apparatus of claim 1,
 wherein each second link includes a second network switch;

wherein the determination system determines if the second network switch for one or more of the protected network devices has failed;

wherein the link switch for each of the protected network devices switches the connection for each protected network device from the second link to the first link for each respective protected network device upon the determination system determining: (1) that the second network switch for the respective protected network device has failed or (2) that the first network switch for the respective protected network device is operational;

wherein the transmission system builds and transmits a second update data packet to network switches of the network over the first link for a protected network device when the link protection device switches the connection for the protected network device from the second link to the first link for the protected network device; and wherein the second update data packet has a source comprising the stored network address of the protected network device and has a destination comprising the broadcast address of the network to thereby emulate a transmission from the protected network device.

4. The apparatus of claim 3, wherein the first link is a primary link, the first network switch is a primary network switch, the second link is a backup link and the second network switch is a secondary network switch.

5. A method comprising the following steps:
(a) switching the connection to a network for a protected network device from a first link for the protected network device to a second link for the protected network device when a first network switch that is part of the first link has been determined to have failed;
(b) building an update data packet having a source comprising a network address of the protected network device and having a destination comprising the broadcast address of the network; and
(c) transmitting the update data packet to network switches of the network to thereby inform the network switches that the protected network device is using the second link instead of the first link,
wherein the update data packet emulates a transmission from the protected network device, and
wherein steps (a), (b) and (c) are conducted by the link protection device of the apparatus of claim 1.

6. The method of claim 5, further comprising the following step:
(d) determining if the first network switch for a protected network device has failed prior to step (a).

7. The method of claim 5, further comprising the following step:
(d) storing the network address of the protected network device prior to step (a), wherein the stored network address is used to build the update data packet in step (b).

8. The method of claim 7, wherein the network address to be stored in step (d) is automatically determined when the protected network device transmits a data packet.

9. The method of claim 7, wherein the network address to be stored in step (d) is provided by a user.

10. The method of claim 5, wherein the first link is a primary link, the first network switch is a primary network switch and the second link is a backup link.

11. The method of claim 5, wherein the first link is a backup link, the first network switch is a backup network switch and the second link is a primary link.

12. A method comprising the following steps:
(a) switching the connection to a network for a protected network device from a first link for the protected network device to a second link for the protected network device when a first network switch that is part of the first link has been determined to have failed;
(b) building an update data packet having a source comprising a network address of the protected network device and having a destination comprising the broadcast address of the network;
(c) transmitting the update data packet to network switches of the network to thereby inform the network switches that the protected network device is using the second link instead of the first link
(d) switching the connection to the network for the protected network device from the second link for the protected network device to the first link for the protected network device when the first network switch is again operational;
(e) building a second update data packet having a source comprising a network address of the protected network device and having a destination comprising the broadcast address of the network; and
(f) transmitting the second update data packet to network switches of the network to thereby inform the network switches that the protected network device is using the first link instead of the second link,
wherein the second update data packet emulates a transmission from the protected network device,
wherein steps (a), (b), (c), (d), (e) and (f) are conducted by the link protection device of the apparatus of claim 3.

13. The method of claim 12, further comprising the following step:
(g) determining if the first link is operational prior to step (d).

14. A method comprising the following steps:
(a) determining if a first network switch that is part of a first link for a protected network device that has previously failed is operational;
(b) switching the connection to a network for the protected network device from a second link for the protected network device to the first link for the protected network device upon the first network switch being determined to be operational in step (a);
(c) building an update data packet having a source comprising a network address of the protected network device and having a destination comprising the broadcast address of the network; and
(d) transmitting the update data packet to network switches of the network to thereby inform the network switches that the protected network device is using the first link instead of the second link,
wherein the update data packet emulates a transmission from the protected network device, and
wherein steps (a), (b), (c) and (d) are conducted by the link protection device of the apparatus of claim 3.

15. The device of claim 1, wherein the transmission system builds and transmits the first update data packet to the network switches of the network over the second link in response to the determination system determining that the first network switch for one or more of the protected network devices has failed.

16. The method of claim 5, wherein step (c) comprises transmitting the update data packet over the second link.

17. The method of claim 14, wherein step (d) comprises transmitting the update data packet over the second link.

* * * * *